United States Patent
Arnon et al.

(10) Patent No.: US 12,153,669 B2
(45) Date of Patent: Nov. 26, 2024

(54) CYBER IMMUNITY SYSTEM AS A BIOLOGICAL SELF-RECOGNITION MODEL ON OPERATING SYSTEMS

(71) Applicant: EMC IP Holding Company LLC, Hopkinton, MA (US)

(72) Inventors: Ohad Arnon, Beit Nir (IL); Dany Shapiro, Alfi Menashe (IL); Shiri Gaber, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 289 days.

(21) Appl. No.: 17/158,650

(22) Filed: Jan. 26, 2021

(65) Prior Publication Data
US 2022/0237285 A1   Jul. 28, 2022

(51) Int. Cl.
*G06F 21/55* (2013.01)
*G06F 21/60* (2013.01)
*G06N 20/00* (2019.01)

(52) U.S. Cl.
CPC ............ *G06F 21/554* (2013.01); *G06F 21/60* (2013.01); *G06N 20/00* (2019.01); *G06F 2221/034* (2013.01)

(58) Field of Classification Search
CPC .. G06F 21/554; G06F 21/60; G06F 2221/034; G06F 17/16; G06F 11/3072; G06N 20/00; G06N 3/084
See application file for complete search history.

(56) References Cited

U.S. PATENT DOCUMENTS

| | | | |
|---|---|---|---|
| 10,692,004 B1* | 6/2020 | Segev | G06Q 50/01 |
| 10,762,206 B2* | 9/2020 | Titonis | H04W 12/128 |
| 10,911,468 B2* | 2/2021 | Muddu | G06F 3/04847 |
| 2014/0108314 A1* | 4/2014 | Chen | G06F 11/3072 706/20 |
| 2020/0097810 A1* | 3/2020 | Hetherington | G06N 20/20 |
| 2020/0097817 A1* | 3/2020 | Harris | G06N 3/04 |
| 2020/0244699 A1* | 7/2020 | Hutchinson | G06N 5/01 |
| 2022/0060490 A1* | 2/2022 | Farshteindiker | G06F 21/552 |
| 2022/0070196 A1* | 3/2022 | Sarkar | G06N 5/02 |

OTHER PUBLICATIONS

Title: Advances in Artificial Immune Systems Author: Dipankar Dasgupta Year: 2006 Publisher: IEEE.*

* cited by examiner

*Primary Examiner* — Shahriar Zarrineh
*Assistant Examiner* — Gita Faramarzi
(74) *Attorney, Agent, or Firm* — Workman Nydegger

(57) ABSTRACT

One example method includes data protection operations including cyber security operations, threat detection operations, and other security operations. Normal device behavior is learned based on data collected by an anomaly detection engine operating in a kernel. The normal data is used to train a machine learning model. Threats are detected when the machine learning model indicates that new data points deviate from normal device behavior. Associated processes are stopped. This allows threats to be detected based on normal behavior rather than on unknown threat behavior.

18 Claims, 6 Drawing Sheets

CYBER IMMUNITY SYSTEM AS A BIOLOGICAL SELF-RECOGNITION MODEL ON OPERATING SYSTEMS

FIELD OF THE INVENTION

Embodiments of the present invention generally relate to data protection including cyber security. More particularly, at least some embodiments of the invention relate to systems, hardware, software, computer-readable media, and methods for data protection operations, which include cyber security operations such as anomaly detection operations.

BACKGROUND

From the early days of computer science, a correlation between cyber security and the immune system can be identified. This is one of the reasons that some threats are referred to as viruses. Computational systems biology is intended to develop computational tools to model biological systems. Deep neural networks are an example of machine learning that is inspired by neurobiology. Efforts in protecting against cyber-attacks continues to be inspired by biology.

Cyber-attacks today are complex and it is generally accepted that blocking 100% of attacks is extremely difficult. One type of problematic attacks is referred to as "zero-day attacks". Zero-day attacks target vulnerabilities that are unknown and often occur before or very soon after the discovery of the vulnerability.

First generation cyber protection systems were designed to be reactive by nature. These systems try to identify attack patterns and malware signatures in a controlled sandbox environment. This can be compared to developing a vaccine for a biological immune system in a lab. Even if these systems achieved success against known viruses or malware, threats are often unknown to the system and change very rapidly. Thus zero-day protection, in which an unknown attack is blocked, was almost impossible for these systems. These limitations were considered tolerable at the time in part because malware did not spread as fast as it does now.

Today, malware spreads and evolves much more quickly. In fact, some attacks are planned as one-shot attacks. In a one-shot attack, a specific malware version is designed to attack only once. These types of malware are enhanced with advanced technology and, as a result, their signatures are difficult to track.

In response, a defensive approach began to be developed: EDR (Endpoint Detection and Response). In practice, EDR may include an agent running on a computer or a network. As part of the attack processing in EDR, data is transmitted to a remote server to determine, based on a set of rules, whether or not a system is experiencing an attack.

Even though EDR systems present new capabilities over their predecessors because they are based on user behavior analytics, EDR systems possess several critical disadvantages. EDR systems, for example, are rule based. Consequently, their learning process is manual in nature and cannot dynamically adjust to threats. In addition, communication delays often cause problems because of the need to communicate with a remote server. These limitations suggest that some attacks are missed by definition. Recent research indicates, in fact, that EDR systems detect only 26 percent of initial vectors of attack and the mean time to identify a breach has increased to 197 days. Failing to identify such attacks can lead to disastrous outcomes. An entire computer, for example, could be encrypted before the system could react. Further, shared directories may place an entire organization at risk.

Machine learning approaches have been implemented in the cyber and trust domain in recent years. However, these approaches only utilize information arriving from the attacker space. As a result, trying to predict what will be the next attack is in effect impossible because the possibilities are practically infinite.

Traditional solutions are based on malware analysis in labs and distributing the malware signature/behavioral flow to the end user that uses this data to block the attack (anti-virus). However, threats are often new, unknown, and change rapidly over time. As a consequence, zero-day attacks which have not been seen by the system before will not be identified and blocked using this approach. Because the signatures of the attacks change very rapidly with the advance of technology it becomes extremely difficult to correctly identify and prevent all attacks. To make matters worse, hackers are now able to identify whether their software is running in a sandbox for examination purposes and, in this case, their malicious software shuts down to avoid being detected. This lack of accuracy leads to many false negatives and false positives which can jeopardize organizations' day-to-day performance.

Conventional systems and advanced EDR systems are not sophisticated enough to prevent all attacks. They often rely on a set of learned rules that determine which program is legitimate. The ability to recognize a threat is further complicated by the fact that the learned set of rules, which concern the legitimate software and actions, need to be constantly updated by humans monitoring the system; it is not automatic in the sense that the set of rules remains static while the system behavior may change. For example, software installations and updates need to be manually configured into the system "white-list". This approach is costly and inaccurate and cannot be applied in real time.

Zero-day attacks that have never been seen before (no rules, no behavior known) can be "injected" into legitimate running processes and avoid being detected by EDR systems. These can be manipulated by applying a legitimate software and action in a malicious manner. As an example, "BART" abuses a zip program to zip your entire computer with "password protected". This is not identified as malware because the program and the action are legitimate, but the extent of the action is not.

As previously stated, many cyber-protection systems rely on communication with a remote server. This dependence on remote communication may allow a malware attack to target the communication component to disable updates and severely impact detection and blocking attempts. The reliance on communications with remote servers also leads to latency when blocking threats at least because data is discretely sent in batches over time. This is critical because it may impact the time it takes to block an attack. Ransomware, for example, can encrypt a computer in seconds.

Even advanced supervised machine learning methods are not efficient in this regard. Machine learning methods often attempt to predict unknown attacks. While this may improve detection capabilities, the rate of false negatives and false positives is high. Further, the datasets for supervised algorithms are often based on known malware that has already been detected. The data sets often do not contain data for unknown threats. This limits the accuracy of the machine learning prediction and hinders the ability to predict new type of malwares. Even if some systems implement artificial intelligence algorithms, the level of detection is limited due to being trained on existing examples. In fact, about 2% of cyber-attacks are never detected, and as much as 16% are detected after months or even years.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
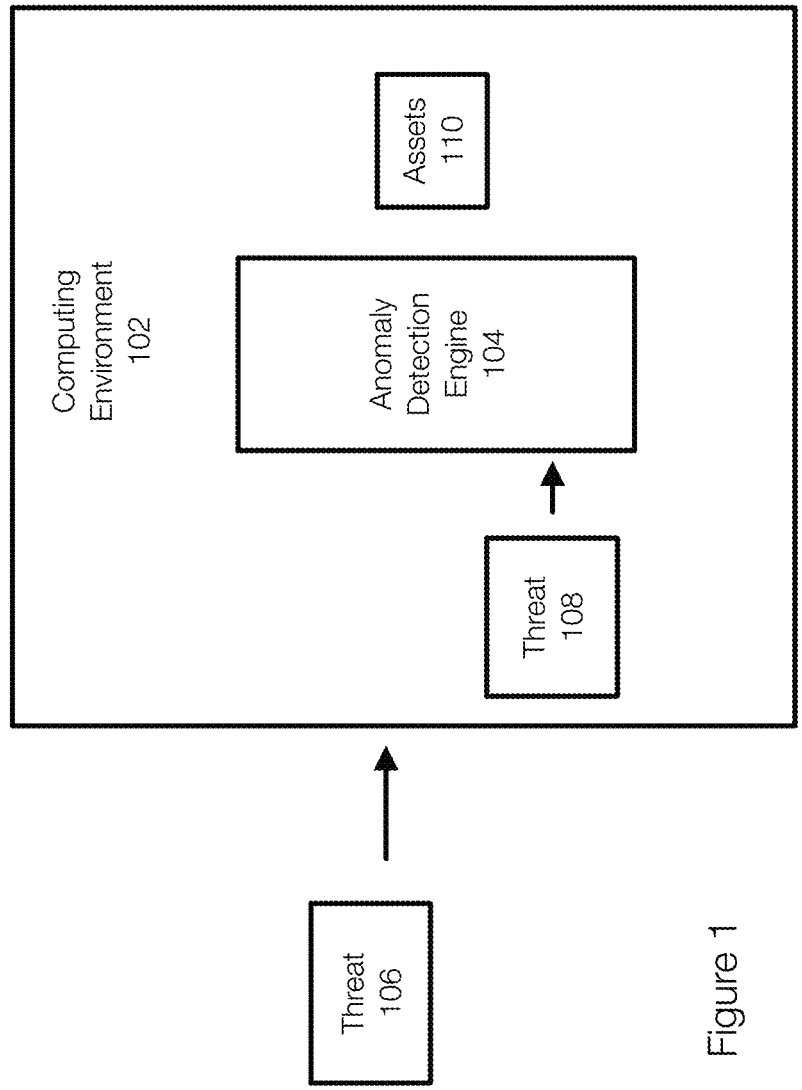
FIG. 1 discloses aspects of an anomaly detection engine configured to protect a computing environment from threats.

Embodiments of the present invention generally relate to data protection and data protection operations. More particularly, at least some embodiments of the invention relate to systems, hardware, software, computer-readable media, and methods for data protection operations including cyber security operations and threat detection and remediation operations.

In general, example embodiments of the invention have the ability to recognize attacks or threats in a computing system by distinguishing between healthy or normal behavior and unhealthy or malicious behavior. More specifically, deviations or anomalies in normal behavior may be viewed as a threat. This self-recognition mechanism learns the normal or expected behavior of the device. When behavior deviates from the normal behavior, a threat may be present and the relevant processes are halted or terminated. This allows threats to be identified based on the behavior of the system itself. There is less reliance of characteristics of the threats or attacks. Embodiments of the invention are able to identify, for example, zero-day attacks more effectively even when such attacks are unknown. Much like an immune system, embodiments of the invention can recognize a foreign body and deploy a response, even when the attack is unknown or, for example, a zero-day attack. A self-recognition mechanism is not present in existing cyber-security systems.

In one example, an anomaly detection engine (which may be machine learning based or artificial intelligence) may be implemented to operate in a kernel of an operating system. This allows the anomaly detection engine to be integrated into the kernel space and act as a self-recognition system. By operating in the kernel space, the anomaly detection engine is hidden to attackers. The anomaly detection engine may collect data such as OS system calls and other events. The data may be collected on a process basis. The collected data may be transformed into time-series data. Features indicative of system behavior in a normal state can be extracted from these features. These features can be learned and when a new flow occurs, residuals can be identified. The residuals may be, for example, a difference between a predicted value and an actual value. Anomalies can be detected based on time periods, based on seasonality, or the like. For example, a process, which is predicted to perform 1 write per second, may be viewed as a threat when the actual writes per second is larger (e.g., 20 writes per second). The residual may contribute to a probability of attack and the process associated with that residual may be terminated in response.

The anomaly detection engine may include a probabilistic model (GMM) that captures the features distribution or the residuals between the actual and predicted performance indicators in different operation modalities. Because anomaly detection engine acts as a self-recognition mechanism, the anomaly detection engine is able to identify unknown zero day attacks with high accuracy. Further, because the anomaly detection engine operates at the kernel level, the anomaly detection engine has near-zero latency and can terminate suspicious processes running in the user space. Embodiments of the invention can be applied in multiple use cases to prevent outcomes that may only be partially detected or handled with conventional approaches.

To specifically attend to unknown zero-day attacks with near-zero latency, the anomaly detection engine may run directly in the operation system as previously stated. The anomaly detection engine may be implemented as a pipeline in the kernel. The anomaly detection engine is configured to deny access to or terminate processes associated with anomalies that are identified in the computer's behavior. This is similar to efficient self-recognition systems and mechanisms operating in biological immune systems.

FIG. 1 discloses aspects of an anomaly detection engine configured to protect a computing environment from threats. Threats includes, but are not limited to, zero-day attacks, viruses, malware, ransomware, worms, or the like or combination thereof. FIG. 1 illustrates an example of a computing environment 102 that may be associated with assets 110 that are the object or subject of a threat. It is understood that the ultimate subject of an attack may be a person or an organization. However, threats 106 and 108 attack assets such as applications, credentials, data (of multiple types), code, communications, patterns, backups, emails, databases, servers, storage, and the like in order to reach their intended victim. Thus, threats, represented by external threats (threat 106) and internal threats (threat 108) typically attack assets 110.

For example, ransomware may encrypt data and then demand a ransom from the owner. Keyloggers may steal input and then fraudulently access a user's account. Other threats may use the assets 110 to access bank accounts, steal technology, commit espionage, or commit other fraud or malicious act. The possibilities and functionality of threats are seemingly endless and are continually generated, which helps explain the difficultly in detecting and stopping all threats.

The computing environment 102 represents different types of computing environments. The computing environment 102 may be a single device (e.g., laptop computer, desktop computer, tablet device, phone, etc.). The computing environment may be virtual or physical. The computing environment 102 may also be a server computer (local or cloud-based), an online compute instance, a cluster of servers, a container or microapplication, or other grouping or network. Depending on the structure or nature of the computing environment 102, one or more instances of the anomaly detection engine 104 may be deployed and these related instances may also be able to communicate with one another such that a threat detected on one network or one network connected device can also start a process to protect other network connected devices, including storage devices, servers, remote devices, and the like.

In one example, the anomaly detection engine 104 may be implemented in a kernel of an operating system. A kernel may be defined in various ways. By way of example only, a kernel may establish a bridge between hardware and software. The kernel may control all of the programs and processes running on a computing device. The kernel may perform and control memory management, process management, disk management, task management, and the like. When the anomaly detection engine 104 detects a threat, the kernel can quickly stop the processes of the attack. The anomaly detection engine 102 can be implemented in physical machines, virtual machines, microservices, containerized applications, and the like. In addition, embodiments of the invention may be implemented in various environments that may include virtual machines, micro-applications, containers, or the like. In each of these environments, there is an operating system involved and embodiments of then invention may be implemented in the corresponding kernel. For example, in the case of virtualization, embodiments of the invention may be implemented in layers one in the host and others on each virtual machine. A microservice is an application running on an operating system. Similarly, containers and virtual machines are also associated with operating systems and embodiments of the invention may operate in or be implemented as a module of the operating system, such as a kernel module in the operating system's kernel.

Generally, embodiments of the invention are configured to respond to threats based on normal behavior of the computing system or, more specifically, based on deviations or anomalies in the normal behavior. This is distinct from systems that attempt to focus on characteristics of the threat or that rely on information outside of the system being protected. For example, virus protection that is based on virus signatures relies on the characteristics of the threat itself. In contrast, embodiments of the invention, similar to a biological immunity system, operate in the environment and respond when the environment is abnormal.

Figure 2A:
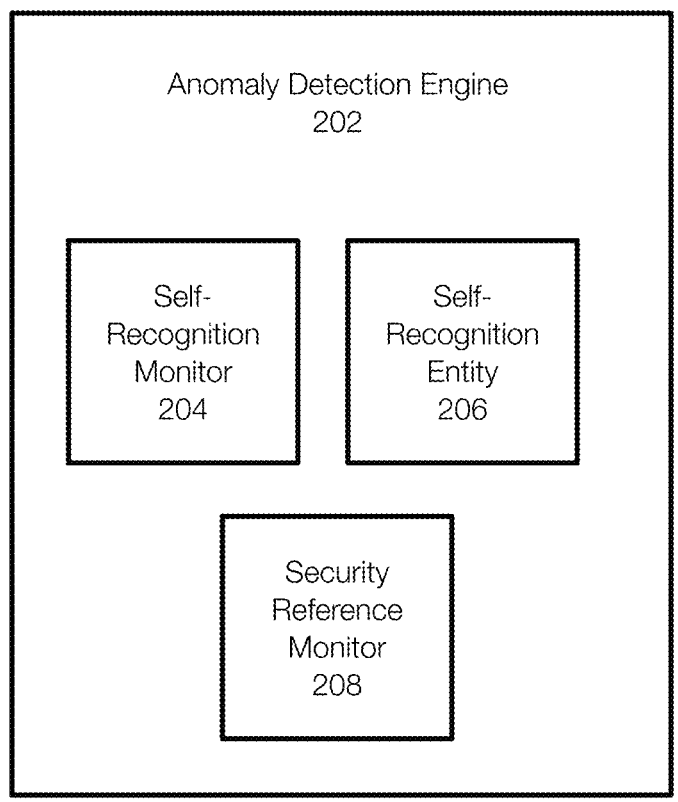
FIG. 2A discloses aspects of the anomaly detection engine including the self-recognition aspects of threat detection.

FIG. 2A discloses aspects of an anomaly detection engine. The anomaly detection engine 202, which is an example of the anomaly detection engine 104, may be implemented in an operating system or more specifically in a kernel of an operating system. The self-recognition monitor 204 is configured to collect information related to behavior of the operating system. This may include system calls, behavior/logs. Because the self-recognition monitor 204 is operating as a kernel module, the self-recognition monitor 204 is able to detect or view all system calls of the kernel. The self-recognition monitor may process the collected information and learn the features thereof. This allows residuals to be generated.

The self-recognition entity 206 is an example of a machine learning model that is automatically trained on the information collected by the self-recognition monitor 204, such as the residuals. The self-recognition entity 206 can be updated constantly as the system behavior changes and new hardware is added/updated or when perceived threats are not actually threats. This allows the self-recognition engine to learn and model normal system behavior.

Figure 2B:
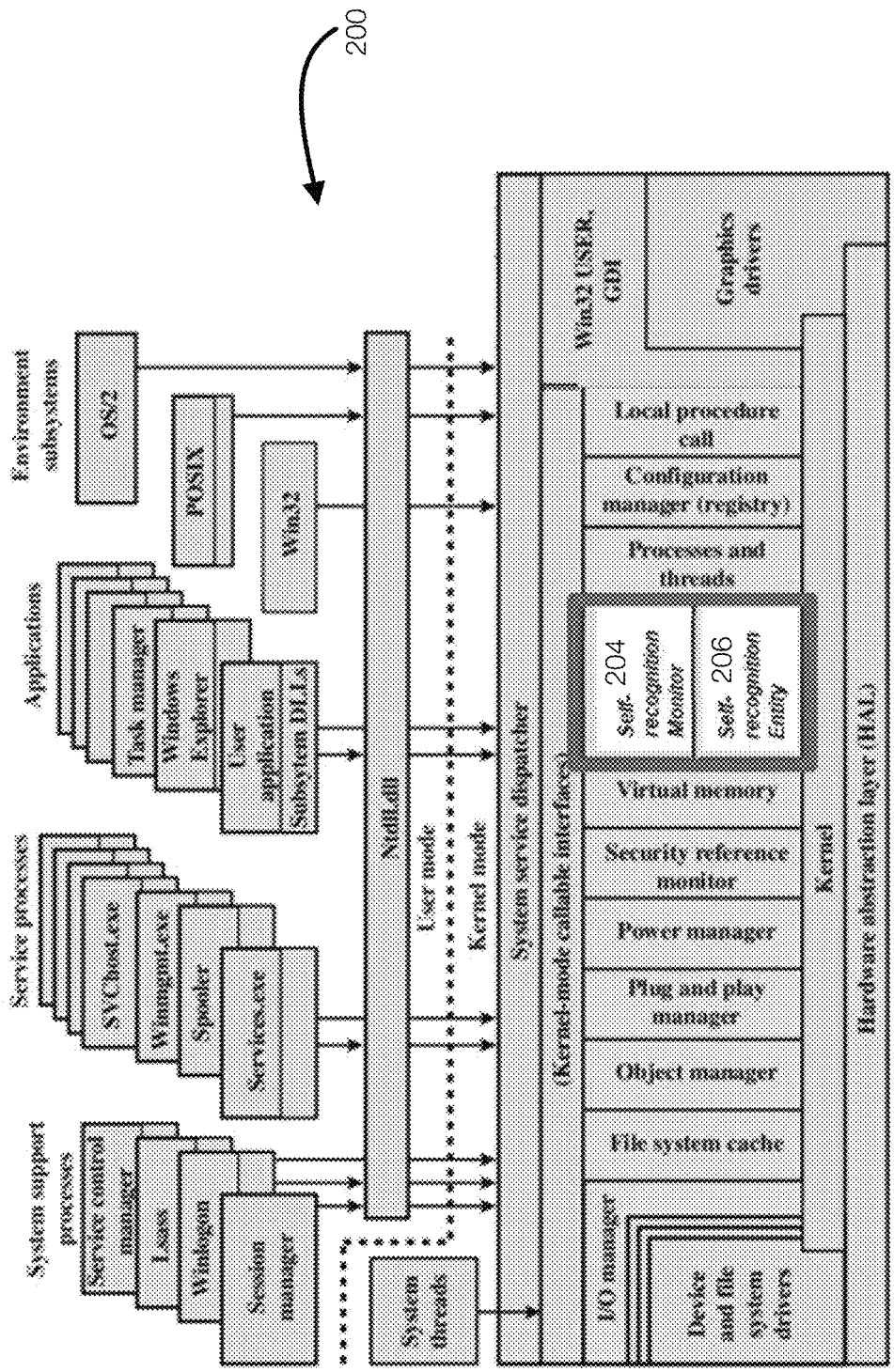
FIG. 2B discloses aspects of an anomaly detection engine operating in a kernel of an example operating system.

The security reference monitor 208 is configured to manage accesses and audit logs throughout the system and observes notifications from the self-recognition monitor 204 and/or entity 206 for process/threads to suspend if necessary, using the process/thread manager that is internal to the object manager (see FIG. 2B). Process termination, however, may be automated such that a detected threat is not waiting on a human response.

FIG. 2B illustrates an example architecture of an operation system such as Windows OS. FIG. 2B illustrates that the self-recognition monitor 204 and the self-recognition entity 206 may be implemented in the kernel of the architecture 200.

The anomaly detection engine may be implemented as a pipeline. The pipeline implements or may include a time series model that is configured to predict the future behavior of each feature. This prediction can be compared to the actual value of the feature, which results in residual data for each feature. The residual data are the inputs to a GMM (Gaussian Mixture Model). By training the GMM with typical residuals, an abnormal residual impacts the output of the GMM and indicates a threat. The process causing the output to indicate a threat is handled (e.g., terminated).

The pipeline may include multiple stages. The first stage is may include the self-recognition monitor and may be running as a part of the kernel of the system's (device, service, etc.) operating system's kernel. The first stage collects information from the OS behavior (e.g., system calls). In a second stage, which may also be part of the self-recognition monitor, a time-series based machine learning model is automatically trained on the information or features extracted from the system calls and/or other information. In addition, the time-series model is configured to learn seasonality. For example, certain updates may occur by way of example, daily, weekly, or monthly. The time-series model thus learns multiple aspects of normal behavior including expected real time behavior, seasonality based behavior, and the like. The time-series based machine learning model may be updated constantly as the system behavior changes, as new software is added/updated, as hardware is changed or updated, or the like or combination thereof. In other words, the time-series based machine learning model can be updated on some basis (e.g., periodically) to account for changes in behavior over time. This allows the time-series model to be kept up to date with respect to normal behavior. In a third stage, which may be implemented in the self-recognition entity, an anomaly from baseline may be detected by a GMM model trained on residual vectors and an "access denied" is given to the task/process that caused the anomaly. The GMM model is also trained continually or periodically with the time-series model output. This behavior by the pipeline is possible in part because the anomaly detection engine is, by way of example, a kernel module. The anomaly detection engine is located in the device kernel, and there may be very small to zero latency.

Embodiments of the invention, rather than relying on characteristics of the threat, determine normal behavior or are trained to recognize normal behavior. A process is identified as a threat when that threat results in a deviation in the normal or expected behavior of the device or system.

Figure 3:
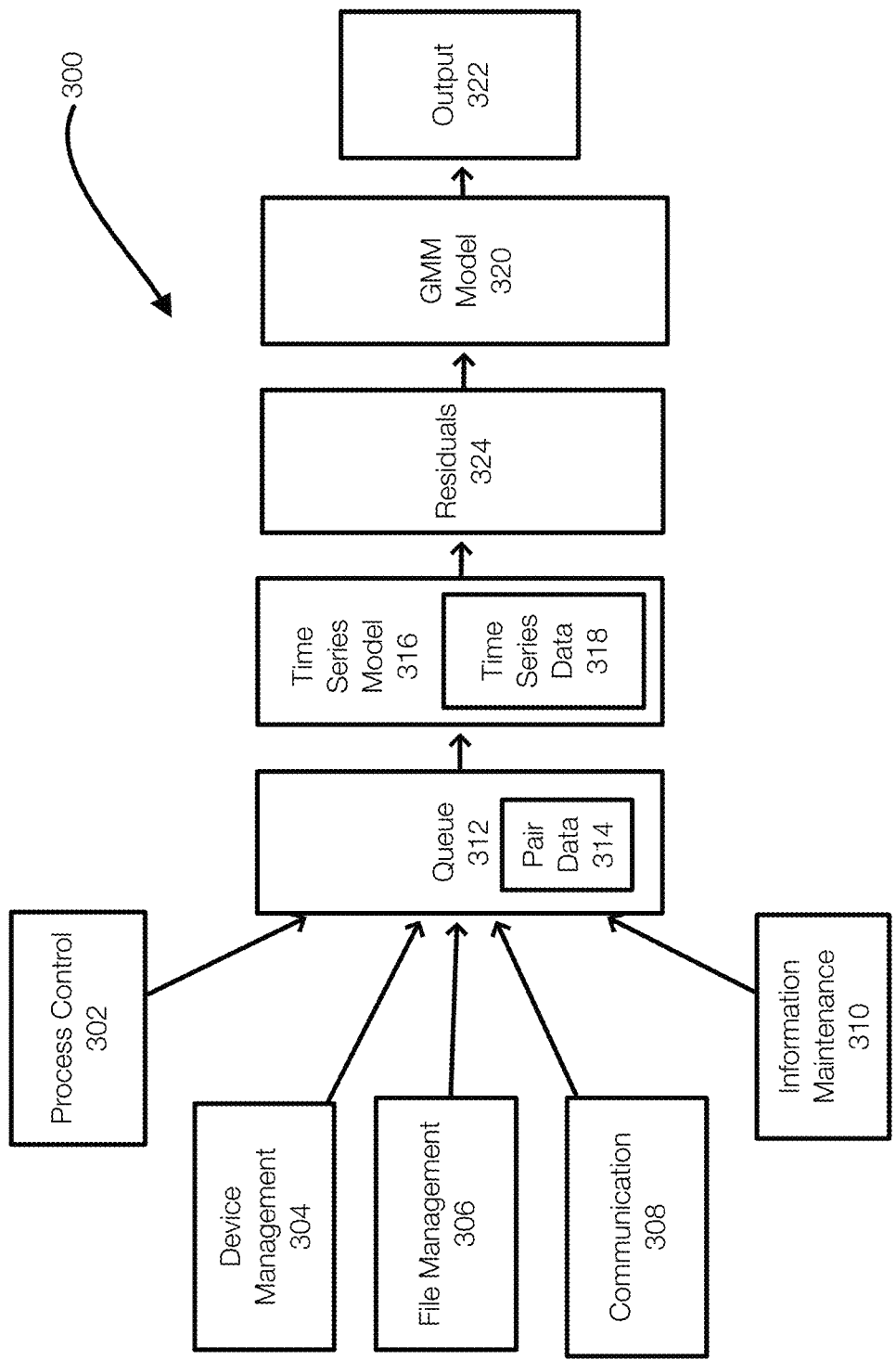
FIG. 3 discloses aspects of a pipeline that includes stages including a monitoring stage and a detection stage.

FIG. 3 discloses aspects of an anomaly detection engine in a pipeline representation. The pipeline 300 represents an example of the anomaly detection engine 202 shown in FIG. 2A.

The pipeline 300 generally operates by collecting data into a queue 312. In one example, each operation of a process in the operating system is interpreted as a system call or a set of system calls. The systems calls are each made by specific processes, which each have a process ID. The data collected includes, by way of example and not limitation, process control 302 data device management 304 data, file management 306 data, communication 308 data, and information maintenance 310 data. These data may be related to system calls, logs, and the like. Inserting the data into the queue 312 allows for asynchronous processing.

Examples of process control 302 data include actions such as load, execute, allocate, and the like. Examples of device management 304 data include request, read, get, and the like. Examples of file management 306 data include create, open, read, and the like. Examples of communication 308 data include send, transfer, and the like. Examples of information maintenance 310 data include system data, data, process attributes, and the like. In other words, the data collected into the queue 312 includes at least information from OS behavior.

Once collected, the data in the queue 312 may be organized as pair data 314. The pair data 314 may be (Process ID:Action). From the collected pair data 314, time series data 318 may be generated. More specifically, the pair data 314, when processed, can be organized as vectors of actions per process ID and vectors of process ID:Action. These vectors can be transformed into numeric data. For example, the number of write actions per second for process X may be an example of time series data. This data acts as time series data features. The temporal patterns can be learned from or identified from or extracted from the time series data 324. More specifically, features are extracted from the time series data 318.

A time series model 316 may be present for each of the features extracted from the time series data 318. The time series model 316 can be trained using the time series data 318. Each time series model 316 can predict the next value that should be created by the system for a given feature. For example, the time series model 316 may predict that process X may have 30 write actions in the next time period.

The prediction is compared to the actual data of the feature to generate residuals 324 for each of the features. For example, if 5 write actions for process X were predicted and 25 write actions actually occurred, then the residual for that feature is 20 (25-5). The vectors of the residuals 324 are input to the model 320, which generates an output 322 representing the probability of an attack.

More specifically, the time series data 318 can be used to train corresponding time series models 316, which may be a baseline behavioral model that has learned normal device or machine behavior. This allows the model 316 to learn normal behavior of each feature and/or the overall system or combination thereof. Once normal behavior is learned, the system behavior as a whole can be learned. Plus, the expected actions can be predicted on a feature basis in one example. Using the predictions of the model 316 and the actual actions that occur and are collected into the queue, the residuals 324 can be determined and input to the model 320. An output based on the input residuals may be a probability of an attack.

When a new data point arrives from the information collected for the OS during continuous operation, the data is processed and input to the models 316 to generate a residual 324 for the various features or vectors. The residual 324 is input to the model 320 to generate an output 322, which is a probability that a threat or attack is occurring. Detecting deviations allows attacks, including zero-day attacks, to be identified even when they are not known or are related to newly discovered vulnerabilities.

If the output 322 is indicative of an attack or suggests an attack, the residuals 324 and/or time series data 318 can be examined to determine which vector or feature or process ID impacted the probability or output 322. For example, if all of the residuals were in size of 0 or around zero and process X had a residual of 25, process X is likely a malicious process and had a significant impact on the output 322. In another example, several processes may create an anomaly while each one of them has a small impact on the output 322. In this example, one or more of these processes can be halted if an attack is suspected.

In another example, consider a process that is attempting to zip a computer's files. If winzip is being used once a day, the behavior of the process will be 0 write actions per period most of the time. When winzip is used, the behavior may be 1 write action per period. When the malicious process uses winzip, a large number of write actions may be seen per period (e.g., 1000 write actions per period). This is detected as an anomaly and the process is terminated.

Embodiments of the invention, however, may also learn seasonality. In another example, the malicious process may zip a file per minute. If the seasonality indicates that files are zipped one a day, a process zipping a file per minute is also detected as an anomaly and terminated.

Figure 4:
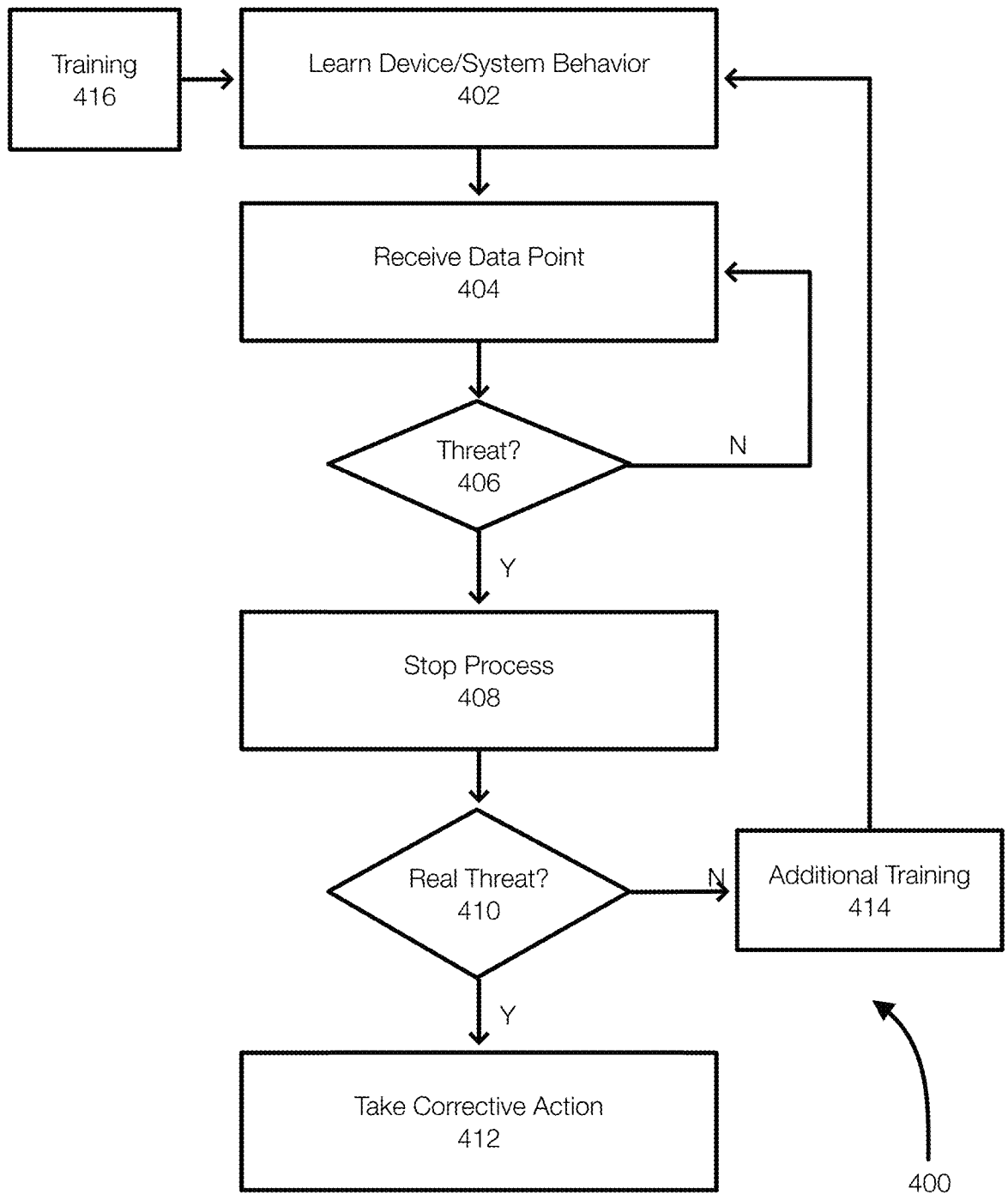
FIG. 4 discloses aspects of a method for detecting threats or for performing a cyber security operation.

FIG. 4 discloses aspects of a method for performing a cyber security operation or for detecting a threat. The method 400 may include elements that are not always performed during operation. The method 400 initially may learn device/system behavior 402, for example by training the model(s) such as the time-series model and the GMM model. In addition, these models may be updated with new training 416 over time to account for variations or changes in the behavior of the device/system. This is done collecting data from system events, logs, actions, and the like. The collected data may be converted to time series data and features of the time series data can be extracted. Residuals can be generated by the time series models by comparing predicted values to actual values. Stated differently, the time series models are trained using data related to system calls and residuals can be generated using the time series models. The residuals are input into a model such as a GMM model to generate a probability of attack that is based on the behavior of the system. Thus, normal behavior of the device/system is learned 402 and the probably of attack can be determined based on deviations from normal device behavior or predicted device behavior.

Once learned, the anomaly detection engine may receive 404 new data point(s) that are suitable for input to the anomaly detection engine. The new flow may be a system call (e.g., a new event in the system, a new log entry, a new command or other action or the like). The new data flow creates new sets of pair data (processID:Action). The time series data generated from these sets of pairs are used to generate residuals, which can be used to determine the probability of an attack and to identify the offending process or processes.

When the new data point or new data points are input, the anomaly detection engine may generate an output (e.g., a probability of an attack or threat). Thus, the method 400 determines 400 whether the new data point or points correspond to a threat. If N at 406, the method may continue operating, collecting data points, and inputting these data points to the anomaly detection engine.

The anomaly detection engine may determine threats based on a threshold probability. If an anomaly is detected, at least one process will be terminated. The system may identify multiple processes that contribute to the probability and terminate each of these processes. In one example, multiple thresholds are present.

A probability output of 5-10 percent, may result in a notification only. A probability greater than 10 percent may cause the process to be terminated.

In one example, a security monitor is provided that allows a system administrator to define the expected behavior and to select options, including a threshold if desired. The options may include, by way of example only, terminating all new processes when a threat is detected, asking the user to confirm each process activity (e.g., process X is attempting to read/write/delete data) before allowing the process to proceed, ask the user to call an administrator to confirm activities, or the like. Each of these options, and others, may be influenced by the actual probability generated by the anomaly detection engine.

If a threat is determined (Y at 406), the associated process may be stopped 408 or terminated immediately. The threat may be confirmed 410. In other words, a determination may be made as to whether the detected threat is actually a threat even though the process was denied access or terminated. If confirmed (Y at 310), corrective action is taken 412. This may include isolating the threat, terminating access to data, removing the threat from the device/system, notifying an administrator, and/or the like. If no threat is determined (N at 410), the method may continue. The operational flow or device behavior, if not a threat or attack, may be used to further train the model.

In one example, additional training 414 is performed such that the anomaly detection engine and the models therein can account for legitimate changes in system behavior and to account for false positives in detected threats.

In one example, the data points collected by the anomaly detection engine represent a flow or an operation flow. A continuously operating device or system is always generating new system calls. Thus, the data points corresponding to the flow are collected and processed as discussed herein.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, cyber security operations, threat detection operations, threat remediation operations, and the like. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment. Embodiments of the invention may also be implemented in New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted with respect to the example method of Figure(s) XX that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1

A method, comprising: learning normal device behavior of a device based on data corresponding to normal device behavior using an anomaly detection engine that includes a machine learning model, collecting data corresponding to a flow of the device, the flow including one or more new data points corresponding to a behavior of the device, generating an output from the machine learning model based on the flow, wherein the output is indicative of whether a threat is present, and stopping at least one process associated with the threat when the output is indicative of the threat.

Embodiment 2

The method of embodiment 1, wherein learning normal device behavior includes collecting data related to system calls.

Embodiment 3

The method of one or more of embodiments 1-2, wherein the data from system calls including one or more of process control data, device management data, file management data, communication data, and information maintenance data.

Embodiment 4

The method of one or more of embodiments 1-3, further comprising generating time series data from the collected data.

Embodiment 5

The method of one or more of embodiments 1-4, further comprising inputting the time series data of the new flow into time series models, wherein each of the time series models corresponds to a feature, wherein residuals are determined for each of the features and inputting the residuals to a model to generate the output, wherein the output is a probability of an attack.

Embodiment 6

The method of one or more of embodiments 1-5, further comprising training the model such that abnormal device behavior is determined to be a threat.

Embodiment 7

The method of one or more of embodiments 1-6, further comprising identifying at least one process that contributed to the probability of the attack and terminating the at least one process.

Embodiment 8

The method of one or more of embodiments 1-7, further comprising verifying whether the threat is a real threat.

Embodiment 9

The method of one or more of embodiments 1-8, wherein the machine learning model is configured to identify whether an attack is occurring based on an output of the machine learning model that represents a deviation from the normal device behavior.

Embodiment 10

The method of one or more of embodiments 1-9, further comprising, wherein the threat is detected by an anomaly detection engine operating in a kernel of an operating system.

Embodiment 11

A method for performing any of the operations, methods, or processes, or any portion of embodiments 1-10 and or any of these, disclosed herein.

Embodiment 12

A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
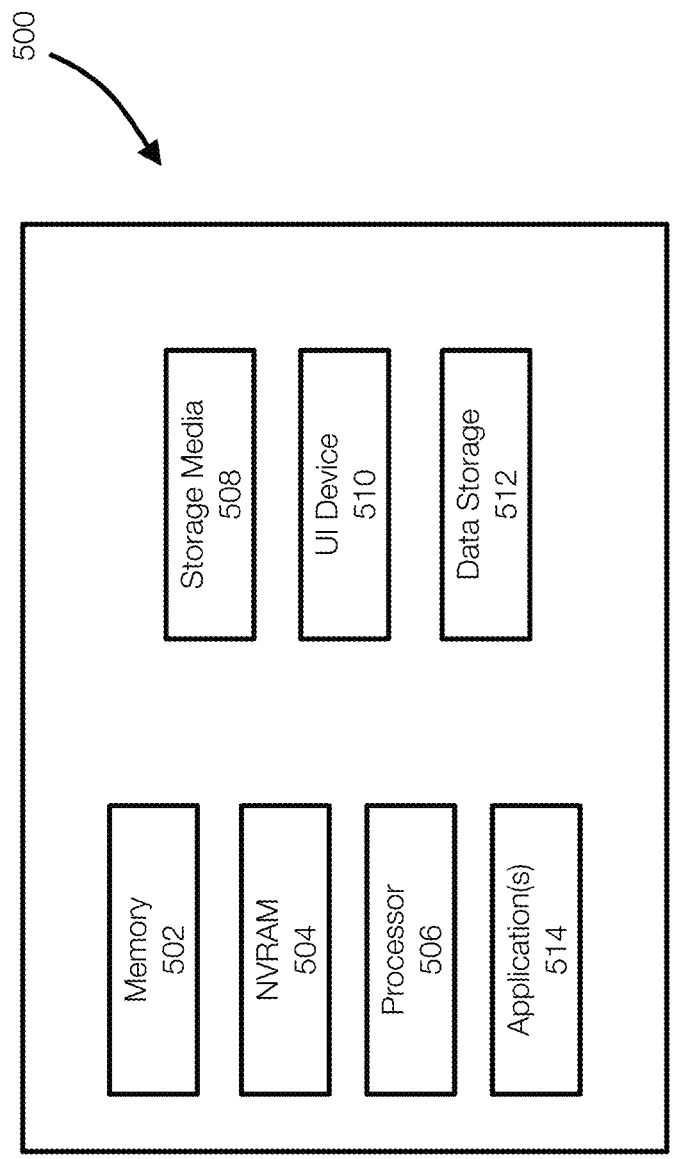
FIG. 5 discloses aspects of a computing device.

With reference briefly now to FIG. 5, any one or more of the entities disclosed, or implied, by FIGS. 1-5 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5 the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for detecting threats in a computing device that includes an operating system, the method comprising:
    collecting data corresponding to a flow of the device, the flow including one or more data points corresponding to a behavior of the device;
    organizing the collected data into pair data, wherein the pair data includes a process identifier and an action;
    generating time series data from the pair data;
    extracting features from the time series data;
    inputting the features extracted from the time series data into time series models, wherein the time series models are configured to generate a predicted value for the features and each of the time series models corresponds to a feature;
    determining residuals for each of the features by comparing the predicted values with actual values of the features;
    inputting the residuals to a machine learning model to generate an output, wherein the output is a probability a threat is occurring, wherein the machine learning model configured to identify anomalous device behavior in the device and wherein the machine learning model is trained using data corresponding to normal device behavior;

identifying, using the process identifiers, one or more processes that contributed to the probability; and stopping at least one process of the one or more processes that contributed to the probability when the output indicates a threat based on the detected anomalous device behavior.

2. The method of claim 1, wherein the normal device behavior is learned from historical collected data that includes historical data corresponding to normal device behavior, further comprising includes generating time series data from the collected data.

3. The method of claim 2, wherein the collected data is collected from system calls including one or more of process control data, device management data, file management data, communication data, and information maintenance data.

4. The method of claim 1, further comprising training the machine learning model such that abnormal device behavior is determined to be the threat.

5. The method of claim 1, further comprising further comprising identifying the one or more processes based on the corresponding residuals.

6. The method of claim 1, further comprising verifying whether the threat is a real threat.

7. The method of claim 1, wherein the machine learning model is configured to identify whether an attack is occurring based on an output of the machine learning model that represents a deviation from the normal device behavior.

8. The method of claim 1, further comprising, wherein the threat is detected by an anomaly detection engine operating in a kernel of an operating system.

9. The method of claim 1, wherein a process that contributes most to the probability is terminated.

10. The method of claim 1, wherein the probability is associated with thresholds, wherein a first threshold is associated with generating a notification, wherein a second threshold is associated with terminating the process.

11. A non-transitory storage medium having stored therein instructions that are executable by one or more hardware processors to perform operations for detecting threats in a computing device that includes an operating system, the operations comprising:

collecting data corresponding to a flow of the device, the flow including one or more data points corresponding to a behavior of the device;

organizing the collected data into pair data, wherein the pair data includes a process identifier and an action;

generating time series data from the pair data;

extracting features from the time series data;

inputting the features extracted from the time series data into time series models, wherein the time series models are configured to generate a predicted value for the features and each of the time series models corresponds to a feature;

determining residuals for each of the features by comparing the predicted values with actual value of the features;

inputting the residuals to a machine learning model to generate an output, wherein the output is a probability a threat is occurring, wherein the machine learning model configured to identify anomalous device behavior in the device and wherein the machine learning model is trained using data corresponding to normal device behavior;

identifying, using the process identifiers, one or more processes that contributed to the probability; and stopping at least one process of the one or more processes that contributed to the probability when the indicates a threat based on the detected anomalous device behavior.

12. The non-transitory storage medium of claim 11, wherein the normal device behavior is learned from historical collected data that includes historical data corresponding to normal device behavior, further comprising includes generating time series data from the collected data.

13. The non-transitory storage medium of claim 12, wherein the collected data is collected from system calls including one or more of process control data, device management data, file management data, communication data, and information maintenance data.

14. The non-transitory storage medium of claim 11, further comprising training the model such that abnormal device behavior is determined to be the threat.

15. The non-transitory storage medium of claim 11, further comprising further comprising identifying the one or more processes based on the corresponding residuals.

16. The non-transitory storage medium of claim 11, further comprising verifying whether the threat is a real threat.

17. The non-transitory storage medium of claim 11, wherein the machine learning model is configured to identify whether an attack is occurring based on an output of the machine learning model that represents a deviation from the normal device behavior.

18. The non-transitory storage medium of claim 11, wherein the threat is detected by an anomaly detection engine operating in a kernel of an operating system.

* * * * *